(12) United States Patent
Ulrich

(10) Patent No.: US 12,056,675 B1
(45) Date of Patent: Aug. 6, 2024

(54) BROWSER PLUG-IN ENABLING USE OF EMV CARD INFORMATION

(71) Applicant: Vantiv, LLC, Symmes Township, OH (US)

(72) Inventor: Chance Ulrich, Alpharetta, GA (US)

(73) Assignee: Worldpay, LLC, Symmes Township, OH (US)

(*) Notice: Subject to any disclaimer, the term of this patent is extended or adjusted under 35 U.S.C. 154(b) by 1247 days.

(21) Appl. No.: 15/333,931

(22) Filed: Oct. 25, 2016

(51) Int. Cl.
G06Q 20/40 (2012.01)
G06Q 20/12 (2012.01)
G06Q 20/34 (2012.01)

(52) U.S. Cl.
CPC ........... *G06Q 20/12* (2013.01); *G06Q 20/341* (2013.01); *G06Q 20/401* (2013.01)

(58) Field of Classification Search
CPC ..... G06Q 20/341; G06Q 20/401; G06Q 20/12
See application file for complete search history.

(56) References Cited

U.S. PATENT DOCUMENTS

| | | | | |
|---|---|---|---|---|
| 7,050,993 B1* | 5/2006 | Piikivi | ............ | G06Q 20/04 705/27.1 |
| 7,103,575 B1* | 9/2006 | Linehan | ............ | G06Q 20/12 235/379 |
| 7,748,609 B2* | 7/2010 | Sachdeva | ............ | G06F 9/468 235/376 |
| 8,403,210 B2* | 3/2013 | Tak | ............ | G06F 9/44526 235/379 |
| 8,799,666 B2* | 8/2014 | Kesanupalli | ............ | G06Q 20/10 382/124 |
| 9,355,391 B2* | 5/2016 | von Behren | ............ | G06Q 20/10 |
| 9,514,458 B2* | 12/2016 | Rutherford | ............ | G06Q 20/04 |
| 9,830,587 B1* | 11/2017 | Bell | ............ | G06Q 30/0601 |
| 9,864,993 B2* | 1/2018 | Weller | ............ | G06Q 20/02 |
| 10,163,107 B1* | 12/2018 | White | ............ | G06Q 20/341 |
| 10,242,357 B1* | 3/2019 | Dorogusker | ............ | G06Q 20/3229 |
| 2002/0038287 A1* | 3/2002 | Villaret | ............ | G07F 7/1025 705/41 |
| 2002/0128981 A1* | 9/2002 | Kawan | ............ | G06Q 20/02 705/67 |
| 2003/0177392 A1* | 9/2003 | Hiltgen | ............ | H04L 9/3271 713/172 |
| 2004/0139028 A1* | 7/2004 | Fishman | ............ | G06Q 20/341 705/67 |
| 2007/0174424 A1* | 7/2007 | Chen | ............ | G06F 9/44526 709/217 |

(Continued)

FOREIGN PATENT DOCUMENTS

WO WO 2013106723 A2 * 7/2013 ........... G06Q 20/326

*Primary Examiner* — Hani M Kazimi
(74) *Attorney, Agent, or Firm* — Bookoff McAndrews, PLLC

(57) ABSTRACT

Systems and methods for facilitating e-commerce transactions between web-based merchants and consumers with EMV cards for payments processing. The systems and methods include a web browser installed in a computer associated with the consumer. The web browser includes a browser plugin for managing EMV card data. The computer is associated with an EMV card reader for collecting EMV card data. The browser plug-in is directed to sending EMV card data for remote processing and/or directed to processing the EMV card natively at the web browser.

12 Claims, 5 Drawing Sheets

(56) References Cited

U.S. PATENT DOCUMENTS

| | | | | |
|---|---|---|---|---|
| 2013/0167045 A1* | 6/2013 | Xu | ............... | G06F 21/6263 |
| | | | | 715/760 |
| 2014/0223175 A1* | 8/2014 | Bhatnagar | ............... | H04L 63/18 |
| | | | | 713/159 |
| 2014/0372320 A1* | 12/2014 | Goldfarb | ............... | G07F 7/1033 |
| | | | | 705/72 |
| 2015/0326564 A1* | 11/2015 | Wang | ............... | H04L 63/0823 |
| | | | | 726/6 |
| 2016/0012428 A1* | 1/2016 | Haldenby | ............ | G06Q 20/383 |
| | | | | 705/39 |
| 2017/0228725 A1* | 8/2017 | Jordan | ............... | G06Q 20/341 |
| 2018/0096329 A1* | 4/2018 | Hamilton | ............ | G06Q 20/322 |

\* cited by examiner

BROWSER PLUG-IN ENABLING USE OF EMV CARD INFORMATION

TECHNICAL FIELD

The present disclosure relates generally to the field of e-commerce transactions and, more particularly, to the use of a web browser plugin for processing EMV card data.

BACKGROUND

Consumers and merchants engage in e-commerce by facilitating the purchase of goods or services across the Internet ("web") through the use of web browsers. Online merchants authorize purchases by collecting credit/debit card information from consumers at the time of purchase. Because online purchases are typically card-not-present transactions, consumers manually supply credit/debit card information into web browsers and are vulnerable to a higher risk of fraud.

SUMMARY

A method is disclosed for managing e-commerce payment transactions, the method comprising: initiating a check-out procedure between a web-based merchant and a consumer, the consumer operating a computer communicatively coupled to an EMV card reader; detecting installation of an EMV browser plugin at a web browser of the computer that enables the web browser to exchange information with an EMV card reader; if the EMV plugin is detected as being installed, then: prompting the consumer to insert an EMV card into the EMV card reader; detecting the insertion of an EMV card into the EMV card reader; directing the browser plugin to collect the EMV card data for processing; and directing the browser plugin to process the EMV card data for payment authorization, receiving an authorization response resulting from processing of the received EMV card data; directing the browser plug-in to acknowledge authorization of the payment transaction; and displaying result of the payment transaction to the consumer through the web browser.

A system for managing e-commerce payment transactions, the system comprising: a data storage device storing instructions for managing e-commerce payment transactions; and a processor configured to execute the instructions to perform a method including the steps of: initiating a check-out procedure between a web-based merchant and a consumer, the consumer operating a computer communicatively coupled to an EMV card reader; detecting installation of an EMV browser plugin at a web browser of the computer that enables the web browser to exchange information with an EMV card reader; if the EMV plugin is detected as being installed, then: prompting the consumer to insert an EMV card into the EMV card reader; detecting the insertion of an EMV card into the EMV card reader; directing the browser plugin to collect the EMV card data for processing; and directing the browser plugin to process the EMV card data for payment authorization, receiving an authorization response resulting from processing of the received EMV card data; directing the browser plug-in to acknowledge authorization of the payment transaction; and displaying result of the payment transaction to the consumer through the web browser.

A non-transitory computer readable medium is disclosed for use on at least one computer system containing computer-executable programming instructions for managing e-commerce payment transactions, the method comprising: initiating a check-out procedure between a web-based merchant and a consumer, the consumer operating a computer communicatively coupled to an EMV card reader; detecting installation of an EMV browser plugin at a web browser of the computer that enables the web browser to exchange information with an EMV card reader; if the EMV plugin is detected as being installed, then: prompting the consumer to insert an EMV card into the EMV card reader; detecting the insertion of an EMV card into the EMV card reader; directing the browser plugin to collect the EMV card data for processing; and directing the browser plugin to process the EMV card data for payment authorization, receiving an authorization response resulting from processing of the received EMV card data; directing the browser plug-in to acknowledge authorization of the payment transaction; and displaying result of the payment transaction to the consumer through the web browser.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Figure 1:
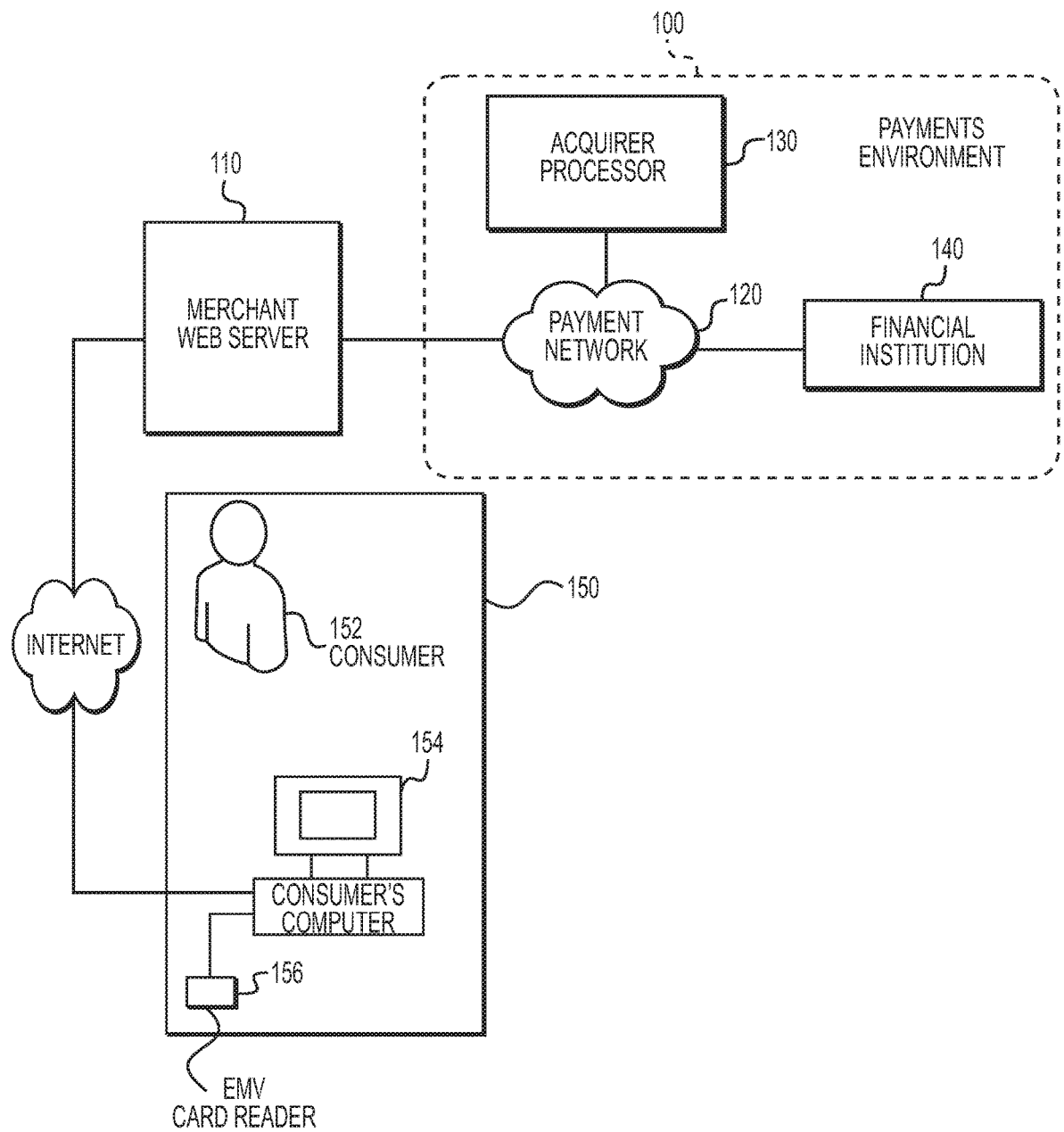
FIG. 1 depicts a merchant environment for processing consumer payment transactions, according to one or more embodiments.

Various non-limiting embodiments of the present disclosure will now be described to provide an overall understanding of the principles of the structure, function, and use of systems and methods disclosed herein related to web browser plugins for processing EMV card information for web-based purchases. One or more examples of these non-limiting embodiments are illustrated in the selected examples disclosed and described in detail with reference made to FIGS. 1 through 5 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

As described above, consumers and online merchants are at an increased risk of fraud when credit/debit card information is manually supplied for purchases made over the Internet. EMV cards have since allowed for stronger authentication measures, but devices that can read EMV cards are generally connected to POS terminals at brick-and-mortar merchant locations. EMV card readers are now becoming available for home use and connect to devices consumers use for making online purchases. Thus, the embodiments of the present disclosure are directed to reducing the risk of fraud when consumers purchase from online merchants by enabling a web browser plugin to authenticate EMV card information.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, or any other like financial transaction instrument.

Point-of-sale ("POS") systems used by merchants generally accept payments from consumers in the form of cash, check, credit cards and so forth. POS systems can include one or more POS terminals and can include back-office computing systems. POS systems and POS terminals can be specialized computing devices configured to send and receive financial transaction data, for example between a POS system and a POS terminal, or with a payment network provider such as an acquirer processor. Acquirer processors similarly can use specialized computing devices configured to send, receive, and process financial transaction data.

FIG. 1 depicts a payments processing network generally comprising an online merchant (or merchant web server 110), acquirer processor 130, financial institution 140, and consumer 152, all provided in communication with each other via a payment network 120. The components of the payments processing network may be connected by any combination of wired or wireless networks, for example, PSTNs and/or the Internet. Acquirer processor 130 (e.g., acquiring bank) is in partnership with payment network 120, such that the acquirer processor 130 may process payments through, and on behalf of, payment network 120. Payment network 120 may in turn have a partnership with financial institution 140 (e.g., issuing bank). Financial institution 140 may hold accounts for one or more of consumer 152. Consumer 152 may have a payment vehicle (e.g., credit card, debit card, stored value card, etc.) which may be affiliated with payment network 120. Consumer 152 may be able to use their payment vehicle for purchases from merchant web server 110.

Acquirer processor 130 may be an entity that provides a variety of electronic payment processing services to merchant web server 110. For example, acquirer processor 130 may be an entity that receives payment information from merchant web server 110. The payment information may be, for example, payment card information encoded in the magnetic stripe or EMV chip of a payment vehicle and a payment amount of a transaction being made by, for example, consumer 152 with merchant web server 110 using the payment card account associated with the payment vehicle. Acquirer processor 130 may process the information, and may send the information to the consumer's respective financial institution 140 via an appropriate payment network 120 depending on the particulars of the payment vehicle. Processing the information may include, for example, determining the identity of payment network 120 and financial institution 140 associated with the particular payment vehicle.

Acquirer processor 130 may also receive information from payment network 120 such as confirmation or rejection of an attempted transaction using the payment vehicle and may convey that information to merchant web server 110. Moreover, acquirer processor 130 may provide security and/or encryption services to merchant web server 110 and payment network 120, such that payments processed may be completed with a decreased risk of data or financial theft or loss. Acquirer processor 130 may be located, for example, remotely from merchant web server 110 that use its services, and may, for example, interact with merchant web server 110 primarily over an electronic network, such as a data network or the Internet.

Payment network 120 may be, for example, a network that relays debit and/or credit transactions to and from various accounts at financial institution 140. For example, payment network 120 may have a partnership program with financial institution 140 through which financial institution 140 may provide a payment vehicle account to consumer 152 associated with payment network 120. Payment network 120 may also be partnered with acquirer processor 130 which may manage payment transactions associated with payment network 120. Examples of payment network brands include, e.g., Visa, MasterCard, Discover, and American Express. While a single payment network 120 is illustrated, it is to be appreciated that multiple payment networks may be partnered with a single or multiple acquirer processors.

Financial institution 140 may be a bank that manages payment accounts associated with one or more of payment network 120 on behalf of one or more of consumer 152. For example, financial institution 140 may allow for consumer 152 to build up a revolving credit balance at financial institution 140 and may periodically receive payments from consumer 152 to pay down the balance. Consumer 152 may be an individual, a company, or other entity having accounts with one or more of financial institution 140. Each consumer 152 may generally have at least one payment vehicle associated with each payment account held by that consumer. Each consumer 152 may have multiple accounts with multiple financial institutions 140 which may be affiliated with the same or different payment network 120.

Merchant web server 110 may be a merchant offering goods and/or services for sale to consumer 152 who have contracted with acquirer processor 130. Merchant web server 110 may be configured to receive payment information from the consumer's payment vehicle and to relay received payment information to acquirer processor 130.

A consumer 152 at a remote location 150 can purchase goods or services from an online merchant by connecting to merchant web server 110. Consumer 152 uses computer 154 to connect to the merchant web server 110 via the Internet. Computer 154 is shown connected to an EMV card reader 156 for use with EMV-based payment vehicles (or EMV cards). The EMV card reader 156 will be further described with reference to FIGS. 2A and 2B. While a computer 154 is illustrated, it is to be appreciated that a consumer 152 can connect to the online merchant with other devices. Examples include set-top boxes used for cable or satellite television access, screen phones, cellular phones, and personal digital assistants (PDAs).

A smart card or EMV (Europay International, Mastercard, and Visa) card is a newer payment vehicle designed to be more secure than prior credit/debit cards. The EMV card includes a logic chip that contains stored information pertaining to the cardholder, such as the cardholder's name, address, and account number. The EMV card is designed for use in a device that can read EMV card data (e.g., EMV card reader). While EMV card readers are typically attached to POS terminals at brick-and-mortar retail locations, EMV card readers are becoming available for consumers to use at remote locations in connection with their home computers. Rather than swiping a card (as with current credit and debit cards that contain a magnetic stripe), EMV cards are generally inserted into smart card readers to enable the exchange of data for payment processing. While the smart card reader is described as one in which an EMV card is inserted for communicating account information, other embodiments are contemplated. For instance, the EMV card can communicate with a smart card reader using a near field communication (NFC) technology, or other secure transport technology to exchange account information. NFC is a short range, high frequency, wireless communication technology that enables the exchange of data between devices over a relatively short distance. Alternatively, online vendors accept payments via third-party payment providers. Example third-party payment providers include, but are not limited to ApplePay™, Android Pay™, PayPal™, and Samsung Pay™ among other suitable third-party payment providers. Consumers 102 can pay for goods and services using their mobile computing device, such as an iPhone™ from Apple™ 7 or an Android™ based smartphone. Data associated with the cards may include an encrypted or unencrypted account number or other encrypted or unencrypted account indicative information and/or encrypted or unencrypted information associated with a particular card, issuer, creator or group of merchants.

During a checkout procedure, merchant web server 110 sends a payment request and identifying indicia of consumer 152 to payments environment 100 for processing and authentication. The payment request can be packaged into a data structure and sent to acquirer processor 130 or other transaction processing entity in payment network 120 for processing. Suitable data structures can include, but are not limited to, proprietary data structures, or data structures to find a suitable notation such as Abstract Syntax Notation One (ASN.1) or Java Script Object Notation (JSON), or any other suitable encoding formats or data structure as would be understood by one of ordinary skill in the art. Acquirer processor 130 can process the transaction with financial institution 140, and the online merchant can receive confirmation of a successful transaction from payment network 120. If not successful, the online merchant can receive information indicating why payment was not able to be made through financial institution 140. The transaction result can be displayed to consumer 152 via the display of computer 154.

Figure 2A:
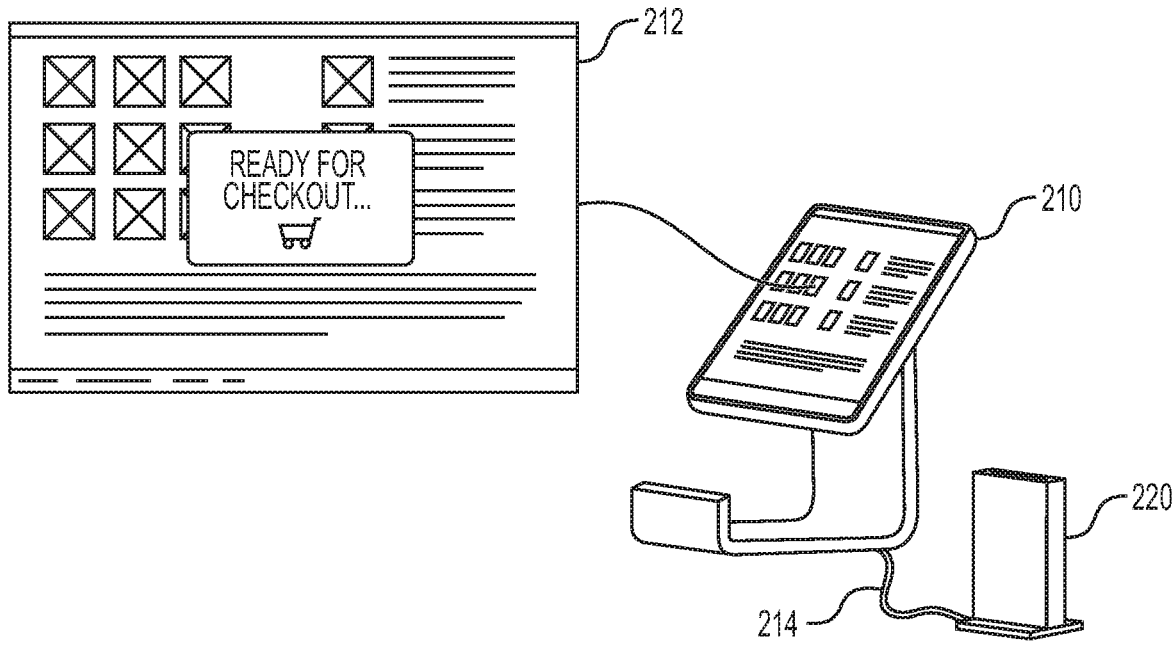
FIG. 2A depicts a consumer's computer during a check-out process, according to one or more embodiments.
Figure 2B:
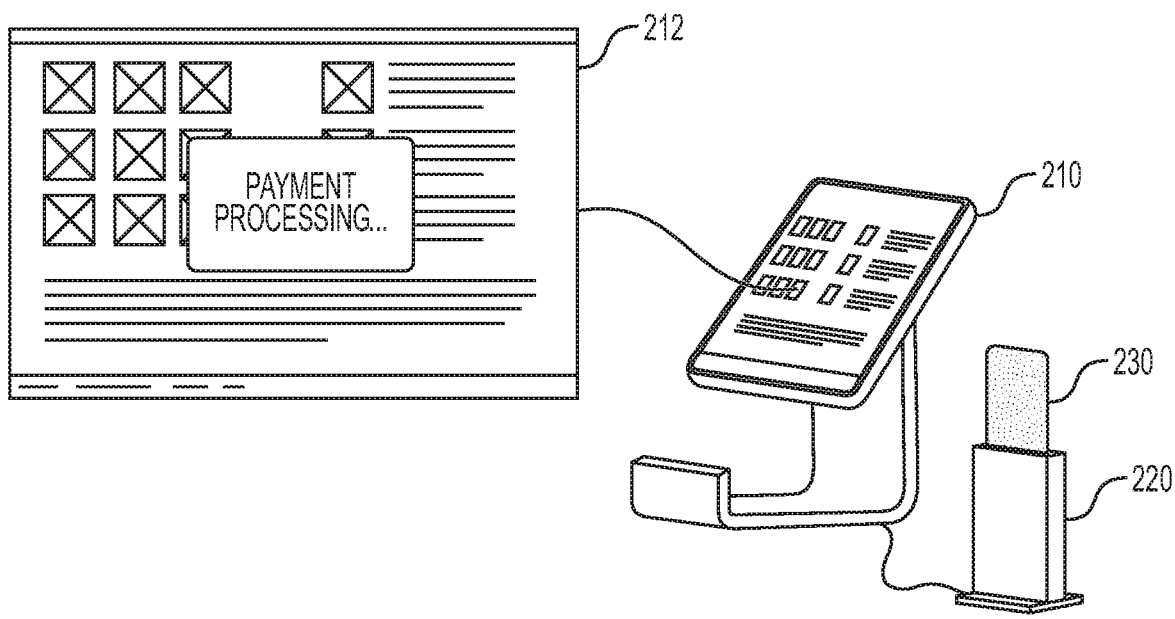
FIG. 2B depicts a consumer's computer during payment processing, according to one or more embodiments.

FIGS. 2A-2B depict an example system and method for facilitating a check-out procedure for online or web-based purchases. In FIG. 2A, consumer 152 uses computer 154 for making online purchases. Computer 154 is shown connected to an EMV card reader 156 via a wired interconnect 214, such as a universal serial bus (USB) cable. While illustrated as a wired interconnect, communication between computer 154 and EMV card reader 156 can be via wireless (e.g., Bluetooth™) technology. Computer 154 is shown with a web browser 212 displayed on a screen of computer 154. A web browser is computer software that enables a consumer to interact with an online merchant over the Internet when making purchases. Web browsers alone are typically unable to interact with peripheral devices that are connected to computer 154. A web browser 'plugin' is software that, when added as a component or extension, enable the web browser to communicate with other devices connected to computer 154.

In the present embodiment, a plugin is added to web browser 212 to enable communication with EMV card reader 156. Thus, when consumer 152 is ready to make an online purchase, merchant web server 110 initiates a check-out procedure which involves checking whether web browser 212 includes a plugin for communicating with a connected EMV card reader. If it is determined that web browser 212 includes the plugin extension (or "EMV plugin"), then the online merchant prompts consumer 152 to insert an EMV-based payment vehicle (or "EMV card"). While the present embodiment prompts for the insertion of an EMV card, contactless protocols for communicating account information between the EMV card and the EMV card reader are also contemplated. For example, the EMV card can communicate account information with a smart card reader using NFC technology. Alternatively, account information can be exchanged using third-party payment providers, such as ApplePay™ Android Pay™ PayPal™ 7 and Samsung Pay™. For purposes of illustration, FIG. 2B depicts the insertion of an EMV card 230 into EMV card reader 156 during a checkout procedure for authentication and obtaining payment authorization.

Figure 3:
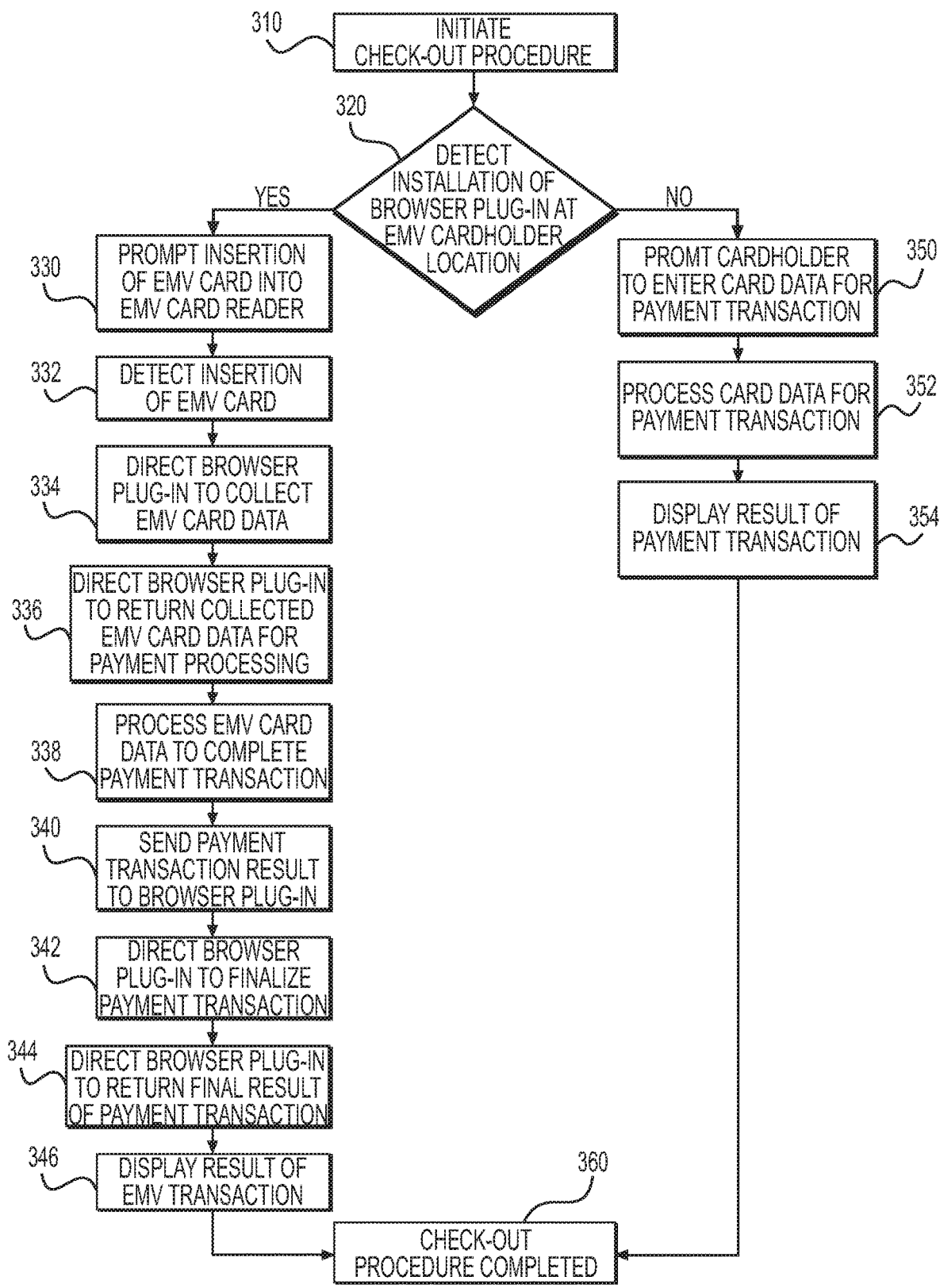
FIG. 3 is a flow chart of an example process of a web browser plugin collecting EMV card data for remote processing, according to one or more embodiments.

FIG. 3 is a flow chart depicting an example process 300 for directing an EMV plugin to collect EMV card data for remote processing (with reference to FIGS. 1, 2A, and 2B). Remote processing involves having the EMV card data collected and returned to merchant web server 110 for processing. In step 310, the online merchant initiates a check-out procedure for consumer 152. In step 320, merchant web server 110 detects whether an EMV plugin is added to web browser 212. If an EMV plugin is detected, then the process proceeds to step 330. In step 330, merchant web server 110 prompts consumer 152 to insert an EMV card 230 into EMV card reader 156. In step 332, merchant web server 110 detects insertion of an EMV card 230. In step 334, merchant web server 110 directs the EMV plugin to collect data from the EMV card 230. In step 336, merchant web server 110 directs the EMV plugin to return the collected data to the online merchant 110 for payment processing. In step 338, merchant web server 110 processes the EMV card to complete the payment transaction and obtain payment authorization. In step 340, merchant web server 110 returns the payment transaction result to the EMV plugin. In step 342, the EMV plugin is directed to finalize the payment transaction. In step 344, the EMV plugin is directed to return the result of the payment transaction in preparation for display. In step 346, the EMV plugin is directed to display the final result of the payment transaction to consumer 152. In step 360, the check-out procedure is completed.

At step 320, if an EMV plugin is not detected, then the process proceeds to step 350. In step 350, consumer 152 is prompted to input payment vehicle information for payment processing. In step 352, the payment vehicle information is processed for finalizing the payment transaction and obtaining authorization. In step 354, the result of the payment transaction is displayed. In step 360, the check-out procedure is completed.

Figure 4:
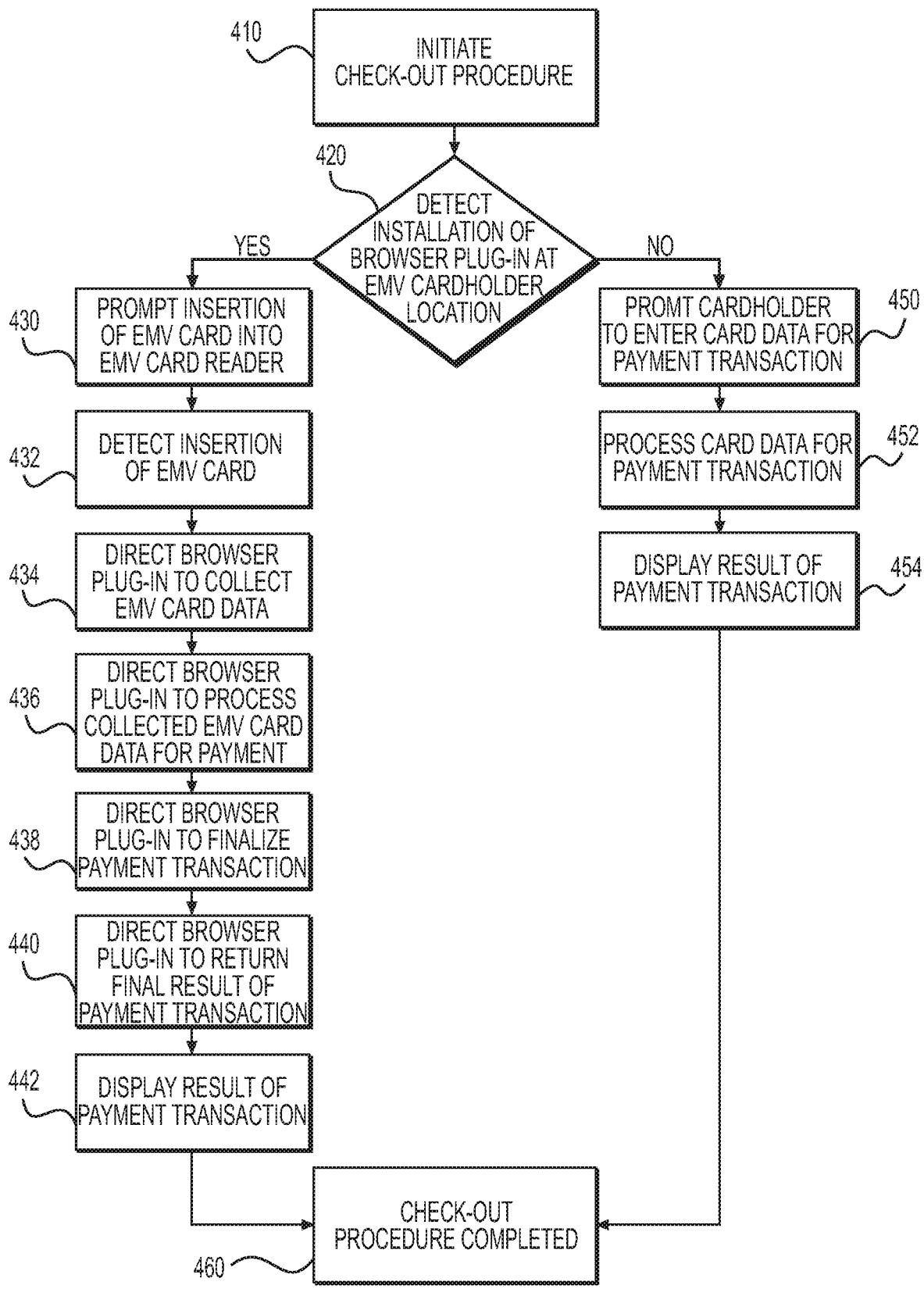
FIG. 4 is a flow chart of an example process of a web browser plugin natively processing EMV card data, according to one or more embodiments.

FIG. 4 is a flow chart depicting an example process for directing an EMV plugin to collect EMV card data for native processing (with reference to FIGS. 1, 2A, and 2B). Native processing involves having the EMV card data collected and processed at computer 154. In step 410, merchant web server 110 initiates a check-out procedure for consumer 152. In step 420, merchant web server 110 detects whether an EMV plugin is added to web browser 212 associated with consumer 152. If an EMV plugin is detected, then the process proceeds to step 430. In step 430, merchant web server 110 prompts consumer 152 to insert an EMV card 230 into EMV card reader 156. In step 432, merchant web server 110 detects insertion of EMV card 230. In step 434, merchant web server 110 directs the EMV plugin to collect data from the EMV card. In step 436, merchant web server 110 directs the EMV plugin to process the collected data for payment processing. In step 438, the EMV plugin is directed to finalize the payment transaction and obtain payment authorization. In step 440, the EMV plugin is directed to return the result of the payment transaction in preparation for display. In step 442, the EMV plugin is directed to display the final result of the payment transaction to consumer 152. In step 460, the check-out procedure is completed.

At step 420, if an EMV plug-in is not detected, then the process proceeds to step 450. In step 450, consumer 152 is prompted to input payment vehicle information for payment processing. In step 452, the payment vehicle information is processed for finalizing the payment transaction. In step 454, the result of the payment transaction is displayed. In step 460, the check-out procedure is completed.

Figure 5:
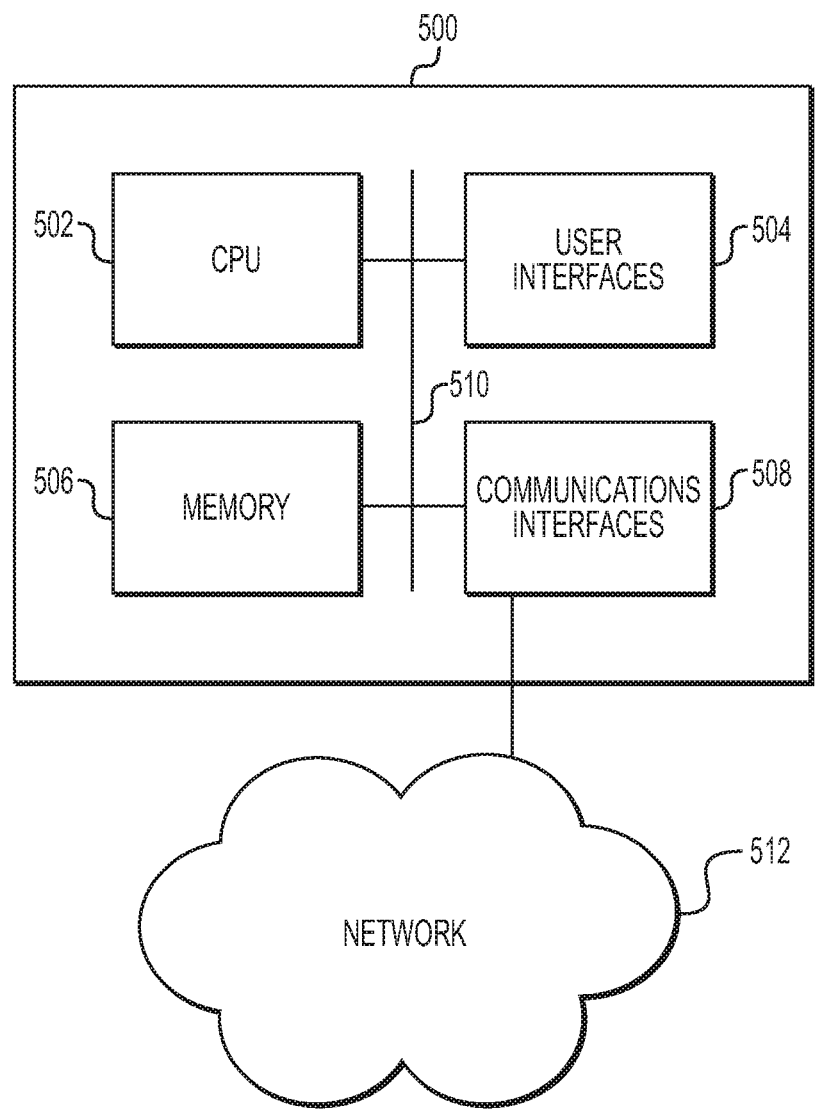
FIG. 5 is a block diagram of an example computing environment, according to one or more embodiments.

The systems and processes described above can be performed on or between one or more computing devices. FIG. 5 illustrates an example computing device. A computing device 500 can be a server, a computing device that is integrated with other systems or subsystems, a mobile computing device such as a smart phone, a cloud-based computing ability, and so forth. The computing device 500 can be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component can be replaced by multiple components and multiple components can be replaced by single component to perform a given function or functions. Except where such substitution would not be operative, such substitution is within the intended scope of the embodiments.

The computing device 500 includes a processor 502 that can be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read-only memory (ROM), random access memory (RAM), cache memory associated with the processor 502, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that can be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer readable medium or media that direct computer system to perform the process steps. Non-transitory computable-readable media, as used herein, comprises all computer-readable media except for transitory, propagating signals.

Networking communication interfaces 508 can be configured to transmit to, or receive data from, other computing devices 500 across a network 512. The network and communication interfaces 508 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 508 can include wire data transmission links such as Ethernet and TCP/IP. The communication interfaces 508 can include wireless protocols for interfacing with private or public networks 512. For example, the network and communication interfaces 508 and protocols can include interfaces for communicating with private wireless networks such as Wi-Fi network, one of the IEEE 802.11x family of networks, or another suitable wireless network. The network and communication interfaces 508 can include interfaces and protocols for communicating with public wireless networks 508, using for example wireless protocols used by cellular network providers, including Code Division Multiple Access (CDMA) and Global System for Mobile Communications (GSM). A computing device 500 can use network and communication interfaces 508 to communicate with hardware modules such as a database or data store, or one or more servers or other networked computing resources. Data can be encrypted or protected from unauthorized access.

In various configurations, the computing device 500 can include a system bus 510 for interconnecting the various components of the computing device 500, or the computing device 500 can be integrated into one or more chips such as programmable logic device or application specific integrated circuit (ASIC). The system bus 510 can include a memory controller, a local bus, or a peripheral bus for supporting input and output devices 504, and communication interfaces 508. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 can include nonvolatile memory for storing computable-readable instructions, data, data structures, program modules, code, microcode, and other software components for storing the computer-readable instructions in non-transitory computable-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A method of managing e-commerce payment transactions, the method comprising:
   initiating a check-out procedure of a payment transaction between a merchant web server and a computer, wherein the computer is communicatively coupled to a Europay International-Mastercard-Visa ("EMV") card reader via a wireless interconnect, and wherein the computer is associated with a consumer;
   detecting whether an EMV browser plugin is added at a web browser of the computer, the EMV browser plugin configured to enable an exchange of information between the web browser and the EMV card reader;
   based on detecting whether the EMV browser plugin is added at the web browser, prompting the consumer to present an EMV card to the EMV card reader if the EMV browser plugin is detected or prompting the consumer to enter payment vehicle information for processing a payment authorization if the EMV browser plugin is not detected;
   detecting a presence of an EMV card at the EMV card reader via near field communication ("NFC");
   directing the EMV browser plugin to collect EMV card data from the EMV card reader;

directing the EMV browser plugin to forward the EMV card data to the merchant web server;
receiving, by the merchant web server that is located remotely from an acquirer processor, the EMV card data;
interacting, by the merchant web server and with the acquirer processor, to complete the payment transaction;
sending, to the EMV browser plugin, an authorization response based on interacting, by the merchant web server and with the acquirer processor, to complete the payment transaction;
directing the EMV browser plugin to acknowledge authorization of the payment transaction; and
displaying, at the web browser, a payment authorization result of the payment transaction to the consumer.

2. The method of claim 1, wherein the consumer is associated with a payment vehicle, and the payment vehicle is an EMV chip card that can communicate via NFC.

3. The method of claim 1, wherein if the EMV browser plugin is not detected as added at the web browser, the method further comprises:
collecting payment vehicle information for processing the payment authorization;
sending payment vehicle information to a payments environment for processing the payment authorization;
receiving a payment authorization result of the processed payment authorization; and
displaying, at the web browser, the payment authorization result of the processed payment authorization.

4. The method of claim 1, wherein the wireless interconnect includes a Bluetooth interconnect.

5. A system for managing e-commerce payment transactions, the system comprising:
a data storage device, wherein the data storage device stores an instruction set for managing e-commerce payment transactions; and
a processor, wherein the processor is configured to execute the instruction set for performing a series of steps, the series of steps including:
initiating a check-out procedure of a payment transaction between a merchant web server and a computer, wherein the computer is communicatively coupled to a Europay International-Mastercard-Visa ("EMV") card reader via a wireless interconnect, and wherein the computer is associated with a consumer;
detecting whether an EMV browser plugin is added at a web browser of the computer, the EMV browser plugin configured to enable an exchange of information between the web browser and the EMV card reader;
based on detecting whether the EMV browser plugin is added at the web browser, prompting the consumer to present an EMV card at the EMV card reader via near field communication ("NFC") if the EMV browser plugin is detected or prompting the consumer to enter payment vehicle information for processing a payment authorization if the EMV browser plugin is not detected;
detecting a presence of an EMV card at the EMV card reader;
directing the EMV browser plugin to collect EMV card data from the EMV card reader;
directing the EMV browser plugin to forward the EMV card data to the merchant web server;
receiving, by the merchant web server that is located remotely from an acquirer processor, the EMV card data;
interacting, by the merchant web server and with the acquirer processor, to complete the payment transaction;
sending, to the EMV browser plugin, an authorization response based on interacting, by the merchant web server and with the acquirer processor, to complete the payment transaction;
directing the EMV browser plugin to acknowledge authorization of the payment transaction; and
displaying, at the web browser, a payment authorization result of the payment transaction to the consumer.

6. The system of claim 5, wherein the consumer is associated with a payment vehicle, and the payment vehicle is an EMV chip card that can communicate via NFC.

7. The system of claim 5, wherein if the EMV browser plugin is not detected as added at the web browser, the series of steps further include:
collecting payment vehicle information for processing the payment authorization;
sending payment vehicle information to a payments environment for processing the payment authorization;
receiving a payment authorization result of the processed payment authorization; and
displaying, at the web browser, the payment authorization result of the processed payment authorization.

8. The system of claim 5, wherein the wireless interconnect includes a Bluetooth interconnect.

9. A non-transitory computer readable medium for use on at least one computer system, the non-transitory computer readable medium containing computer-executable programming instructions for managing e-commerce payment transactions, the computer-executable programming instructions including the steps of:
initiating a check-out procedure of a payment transaction between a merchant web server and a computer, wherein the computer is communicatively coupled to a Europay International-Mastercard-Visa ("EMV") card reader via a wireless interconnect, and wherein the computer is associated with a consumer;
detecting whether an EMV browser plugin is added at a web browser of the computer, the EMV browser plugin configured to enable an exchange of information between the web browser and the EMV card reader;
based on detecting whether the EMV browser plugin is added at the web browser, prompting the consumer to present an EMV card to the EMV card reader if the EMV browser plugin is detected or prompting the consumer to enter payment vehicle information for processing a payment authorization if the EMB browser plugin is not detected;
detecting a presence of an EMV card at the EMV card reader via near field communication ("NFC");
directing the EMV browser plugin to collect EMV card data from the EMV card reader;
directing the EMV browser plugin to forward the EMV card data to the merchant web server;
receiving, by the merchant web server that is located remotely from an acquirer processor, the EMV card data;
interacting, by the merchant web server and with the acquirer processor, to complete the payment transaction;
sending, to the EMV browser plugin, an authorization response based on interacting, by the merchant web server and with the acquirer processor, to complete the payment transaction;

directing the EMV browser plugin to acknowledge authorization of the payment transaction; and displaying, at the web browser, a payment authorization result of the payment transaction to the consumer.

10. The non-transitory computer readable medium of claim 9, wherein the consumer is associated with a payment vehicle, and the payment vehicle is an EMV chip card that can communicate via NFC.

11. The non-transitory computer readable medium of claim 9, wherein if the EMV browser plugin is not detected as added at the web browser, the steps further include:

collecting payment vehicle information for processing the payment authorization;

sending payment vehicle information to a payments environment for processing the payment authorization;

receiving a payment authorization result of the processed payment authorization; and displaying, at the web browser, the payment authorization result of the processed payment authorization.

12. The non-transitory computer readable medium of claim 9, wherein the wireless interconnect includes a Bluetooth interconnect.

\* \* \* \* \*

UNITED STATES PATENT AND TRADEMARK OFFICE
CERTIFICATE OF CORRECTION

| | | |
|---|---|---|
| PATENT NO. | : 12,056,675 B1 | Page 1 of 1 |
| APPLICATION NO. | : 15/333931 | |
| DATED | : August 6, 2024 | |
| INVENTOR(S) | : Chance Ulrich | |

It is certified that error appears in the above-identified patent and that said Letters Patent is hereby corrected as shown below:

In the Claims

In Column 12, Line 50, Claim 9, delete "EMB" and insert --EMV--.

Signed and Sealed this
Seventeenth Day of September, 2024

*Katherine Kelly Vidal*

Katherine Kelly Vidal
*Director of the United States Patent and Trademark Office*